April 7, 1953  A. HOPKINSON  2,634,096
HOISTING OR HAULAGE GEAR
Filed Jan. 30, 1950  2 SHEETS—SHEET 1

Inventor
AUSTIN HOPKINSON
By *Emery Holcombe & Blair*
Attorneys

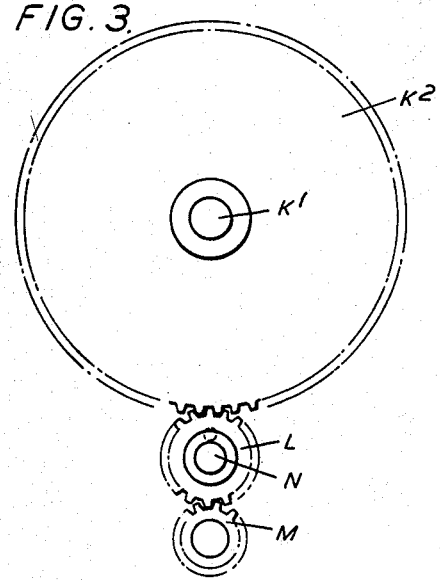
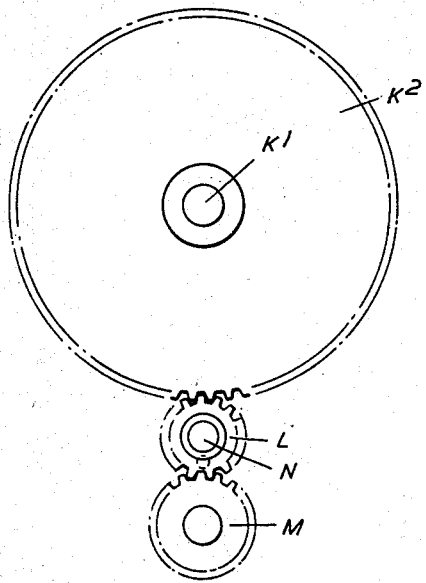
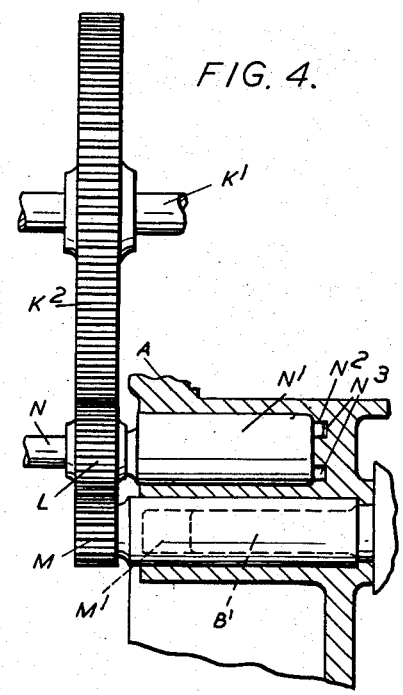
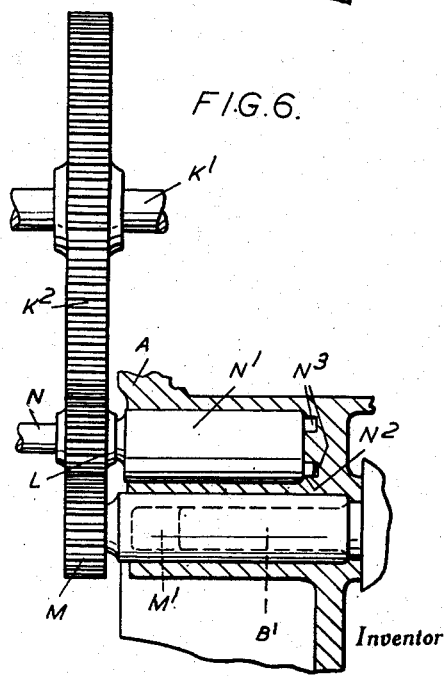

Patented Apr. 7, 1953

2,634,096

UNITED STATES PATENT OFFICE 2,634,096

HOISTING OR HAULAGE GEAR

Austin Hopkinson, London, England

Application January 30, 1950, Serial No. 141,221
In Great Britain June 8, 1949

6 Claims. (Cl. 254—185)

This invention relates to hoisting or haulage gear of the kind comprising a prime mover such as an electric motor disposed within a cylindrical casing on which one or more winding drums are mounted to rotate, with transmission gearing between the prime mover and the drum or each of the drums to enable the drum or drums to be driven from the prime mover as and when desired.

The object of the invention is to provide an improved hoisting or haulage gear of the above kind which will be simple, robust and compact and well adapted to its purpose.

The invention is particularly but not exclusively applicable to haulage gear of the kind employed in excavating and like operations to drag spoil from the point at which it accumulates by means of a scraper or container.

Hoisting or haulage gear of the kind referred to according to the present invention comprises, in combination with the prime mover disposed within the cylindrical casing on which the one or more winding drums are mounted to rotate, transmission gearing between the prime mover and the drum or each of the drums including a friction clutch coaxial with the drum and hydraulic mechanism for causing engagement or disengagement of the clutch comprising an annular piston coaxial with the drum, disposed within a stationary hydraulic cylinder and arranged to rotate in the cylinder with the drum when the clutch is engaged, and means for admitting hydraulic fluid under pressure and permitting its escape from the annular cylinder to control the engagement and disengagement of the clutch.

According to a further feature of the invention, the transmission gearing between the prime mover and the drum or each drum is arranged to enable the transmission ratio to be varied at will. To this end the transmission gearing comprises a driving gear wheel connected in a readily detachable manner to the shaft of the prime mover so that driving gear wheels of either one of two or more different diameters can be used alternatively, a driven gear wheel through which rotation is transmitted to the driving member of the clutch and an intermediate idler gear wheel meshing with the driving and driven gear wheels and mounted upon a pivot projecting eccentrically from a cylindrical support, the support being capable of being inserted into and retained in a supporting housing in either one of two or more rotational positions so as to enable the position of the pivot to be varied, while the idler gear is capable of ready replacement by a gear of different size to suit the size of driving gear and the rotational position of the support all for the purpose of enabling the ratio of transmission between the prime mover and the driven gear to be changed. Thus such a change in ratio can be effected by substituting one sized driving gear for another, the idler gear support in its appropriate rotational position within its housing and changing the size of the idler gear so that with the new pivot position, and the new size of idler gear, the idler gear will still mesh with the driven gear and also with the new size of driving gear.

The invention may be carried into practice in various ways but one construction according to the invention is illustrated somewhat diagrammatically by way of example as applied to haulage or hoisting gear comprising two drums capable of being driven together or separately from a single prime mover, in the accompanying drawings in which.

Figures 3 and 5 are side elevations and Figures 4 and 6 are plan views partly in section corresponding respectively to Figures 3 and 5, illustrating how the gear ratios between the prime mover and the drums can be changed in the apparatus illustrated.

In the construction illustrated the apparatus comprises a rigid supporting frame A carrying or including a cylindrical casing $A^1$ in which is rigidly mounted an electric motor B, the casing being formed as shown in two or more separable sections to permit assembly of the motor therein.

Rotatably mounted upon the casing are two haulage or hoisting drums C, $C^1$ on each of which can be wound a haulage or hoisting rope or cable in known manner. The flangles $C^2$ at the outer ends of the drums C, $C^1$ are each provided at their outer faces with an axial flange $C^3$ the inner circumferential surface of which is splined or similarly formed to engage projections or notches in the circumferential edges of a series of the driven plates D of a multi-plate clutch, the driving plates $D^1$ of which have their inner circumferential edges formed with notches or projections to engage splines on the hub E of a gear wheel $E^1$ mounted to rotate upon the casing $A^1$. Formed in the part of the frame A adjacent to the outer face of each gear wheel $E^1$ is an annular chamber F constituting an annular cylinder in which lies an annular piston G. Springs $G^1$ interposed between the piston G and the adjacent face of the gear wheel $E^1$ serve normally to force the piston G away from the gear wheel E and, interposed between the piston G and the adjacent plate $D^1$ of the clutch are a series of push rods or thrust members H capable of sliding freely in suitable bearing bores formed in the gear wheel $E^1$ as shown.

Figure 1:
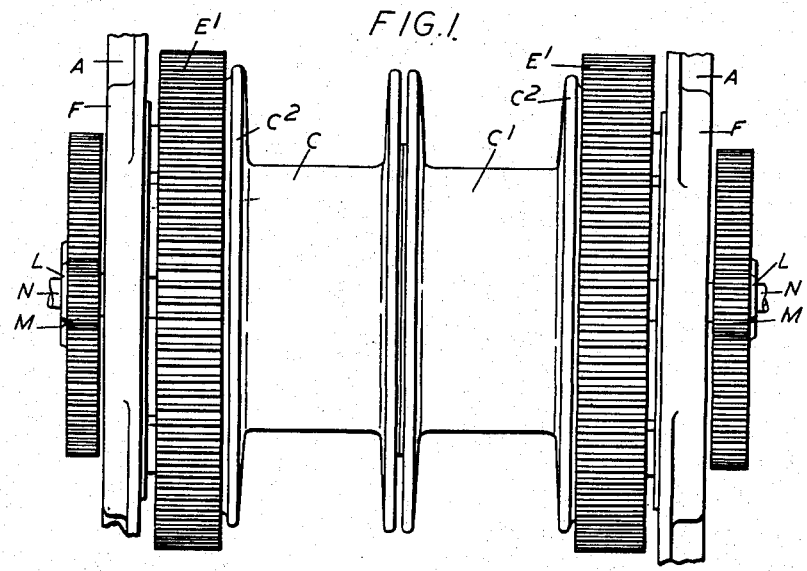
Figure 1 is an elevation of the apparatus.
Figure 2:
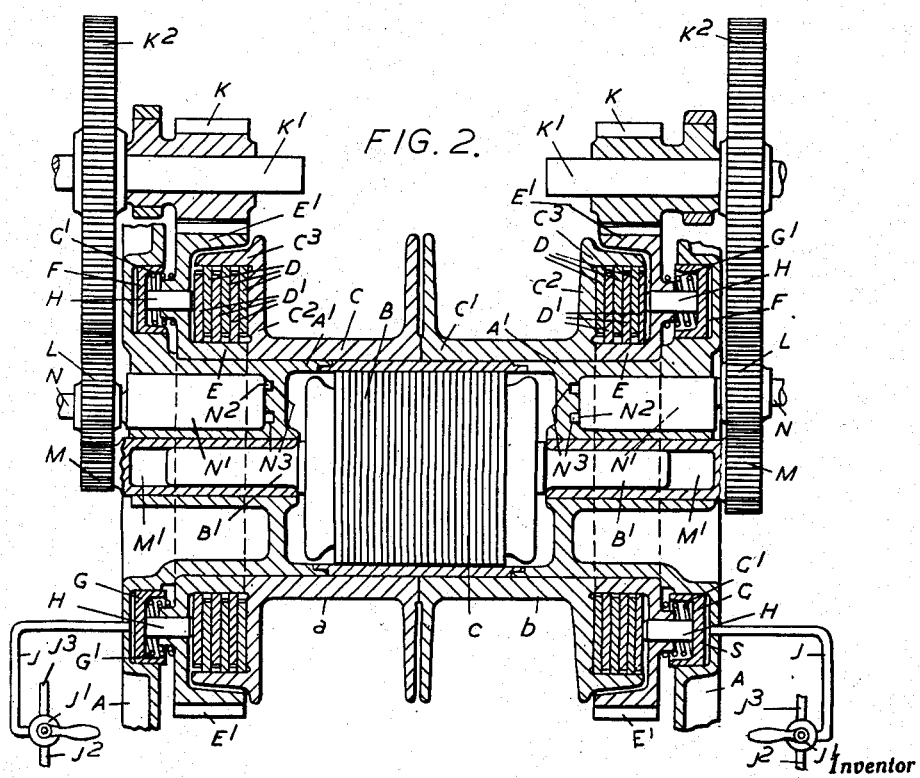
Figure 2 is a sectional plan of the apparatus.

Means, diagrammatically shown in Figure 2 as a pipe J which can be connected through a control valve $J^1$ either to a source of hydraulic pressure through a pipe $J^2$ or to a relief passage $J^3$ are provided by which hydraulic fluid under pressure can be admitted to or permitted to escape from the annular cylinder. The parts J, $J^1$, $J^2$ and $J^3$ are omitted from Figure 1 for the sake of clarity. It will thus be seen that when hydraulic fluid under pressure is admitted to either cylinder F, the associated piston G will move towards the adjacent gear wheel $E^1$ and will act through the push rods H to press the plates D, $D^1$ of the appropriate clutch into close frictional contact and thus engage the clutch in known manner, whereas when hydraulic fluid is permitted to escape from the cylinder F the springs $G^1$ will move the annular piston $G^1$ away from the adjacent gear wheel $E^1$ and thus relieve the pressure on the clutch plates so that the clutch is dis-engaged.

Each gear wheel $E^1$ meshes with a gear wheel K upon a lay-shaft or back-shaft $K^1$ which also carries a gear wheel $K^2$ meshing with an idler gear wheel L which meshes with a gear wheel M connected to the shaft $B^1$ of the electric motor. Each of the gear wheels M is mounted upon the end of a tubular shaft or support $M^1$ carried in bearings within the casing $A^1$ and internally splined or similarly formed to engage the adjacent correspondingly formed end of the shaft $B^1$ of the motor so as to be connected to such shaft and yet be readily capable of being removed and replaced. Each of the idler gear wheels L is mounted upon a spindle N eccentrically carried by a cylindrical support $N^1$ mounted within a housing within the casing $A^1$, the support $N^1$ having on its inner end a locating pin or dowel $N^2$ which can engage either one of two dowel holes $N^3$ thus permitting the support $N^1$ to be inserted into its housing in either one of two rotational positions and maintained therein by the engagement of the dowel pin $N^2$ with the appropriate dowel hole $N^3$. In this way it will be seen that the axis about which the idler gear L rotates can lie in either one of two positions. The idler gear L can readily be replaced upon its spindle N by another idler gear of different diameter and it will be seen that with this arrangement by changing the gear wheel M for a gear wheel of appropriate different size and also changing the idler gear wheel L for a gear wheel of appropriately different size and changing the rotational position of the support $N^1$ within its housing the transmission ratio as between the motor shaft $B^1$ and the gear wheel $K^2$ can be changed for the purpose of changing the transmission ratio between the motor and the appropriate drum. The arrangements providing two alternative gear ratios are illustrated respectively in Figures 3 and 4 and Figures 5 and 6. Thus in Figures 3 and 4 it will be seen that the gear wheel M is relatively small, the idler gear wheel L is relatively large and the position of its axis is that in which it is nearer to the axis of the gear wheel M. In Figures 5 and 6, however, the gear wheel M is relatively large, the idler gear wheel L is relatively small and the position of its axis is that in which it lies more remote from the axis of the gear wheel M, the difference in the positions of the axes of the idler gear wheels L in the two arrangements being such as to compensate for the differences in the diameters of these gear wheels so that each size of idler gear wheel L meshes properly with the gear wheel $K^2$.

It will be seen that the invention provides a simple, compact and robust construction providing for ready control of the clutches and for ready alteration of the gear ratio as between the electric motor and either drum when desired.

What I claim as my invention and desire to secure by Letters Patent is:

1. A hoisting or haulage gear including in combination a cylindrical housing, a prime mover including a drive shaft disposed within the housing, at least one winding drum mounted to rotate upon the housing and transmission gearing between the prime mover and the drum including a friction clutch coaxial with the drum, and hydraulic mechanism for causing engagement and disengagement of the clutch comprising an annular piston coaxial with the drum, an operative connection between the annular piston and the part of the clutch which is moved for engagement and disengagement thereof, a stationary hydraulic cylinder in which the piston lies and can rotate with the drum when the clutch is engaged and means for admitting hydraulic fluid under pressure to and permitting its escape from the annular cylinder to control the engagement and disengagement of the clutch.

2. A hoisting or haulage gear as claimed in claim 1, in which the transmission gear between the prime mover and the driving member of the clutch comprises a driving gear connected in a readily detachable manner to the shaft of the prime mover, a driven gear wheel through which rotation is transmitted to the driving member of the clutch and an intermediate idler gear wheel meshing with the said driving gear and the said driven gear wheel and mounted upon a journal, a cylindrical support eccentrically carrying said journal, and a bore formed in said cylindrical housing, the support being capable of being inserted into said bore and retained therein in either one of two or more rotational positions so as to vary the position of the pivot, while the idler gear is capable of ready replacement by a gear of different size for the purpose set forth.

3. A hoisting or haulage gear including in combination a cylindrical housing, a prime mover including a drive shaft disposed within the housing, at least one winding drum mounted to rotate on the housing and transmission gearing between the prime mover and the drum comprising a driving clutch member arranged coaxially with the drum, a friction clutch for connecting the drum to a driving clutch member, a driving gear wheel connected in a readily detachable manner to the shaft of the prime mover, a driven gear wheel by which rotation is transmitted to the driving clutch member and an intermediate idler gear wheel meshing with the said driving gear and the said driven gear wheel mounted upon a journal, a cylindrical support eccentrically carrying said journal, and a bore formed in said cylindrical housing, cylindrical support being capable of being inserted into said bore and retained therein either one of at least two rotational positions in which the position of the pivot is therefore different while the idler gear is capable of ready replacement by a gear of different size suited to the position of the said pivot.

4. A hoisting or haulage gear comprising a cylindrical housing, a prime mover including a drive shaft disposed within the housing, two winding drums mounted to rotate side by side upon the housing, friction clutches whereby the outer ends of the two drums can be connected respectively to two driving members mounted to rotate coaxially with the drums, and transmission gearing between each of the said driving members and the adjacent end of the shaft of the prime mover, each of the friction clutches having associated therewith hydraulic mechanism for causing engagement and disengagement of the clutch and comprising an annular piston coaxial with the drum and mounted to rotate therewith when the clutch is engaged, a stationary hydraulic cylinder in which the piston lies and can rotate and means for admitting hydraulic fluid under pressure to and permitting its escape from the annular cylinder to control the engagement and disengagement of the clutch.

5. A hoisting or haulage gear as claimed in claim 4 in which the transmission gearing between each end of the shaft of the prime mover and the adjacent driving member of a clutch comprises a driving gear wheel connected in a readily detachable manner to the said end of the shaft of the prime mover, a driven gear wheel through which rotation is transmitted to the said driving member of the clutch and an intermediate idler gear wheel meshing with the said driving gear and the said driven gear wheel and mounted upon a journal, a cylindrical support eccentrically carrying said journal, and a bore formed in said cylindrical housing, the cylindrical support being capable of being inserted into said bore and retained therein in either one of at least two rotational positions in which the position of the pivot will be different while the idler gear is capable of ready replacement by a gear of different size suited to a given position of the said pivot.

6. A hoisting or haulage gear as claimed in claim 5 in which each clutch is of the multiplate type and said gear has a plurality of circumferentially spaced pins one end of each of which acts on the outer face of the outer plate of the clutch, while its other end is arranged to be acted upon by the adjacent face of the piston, springs being provided tending to force the piston axially away from the clutch while hydraulic pressure admitted to the cylinder forces the piston towards and thereby engages the clutch.

AUSTIN HOPKINSON.

REFERENCES CITED

The following references are of record in the file of this patent:

UNITED STATES PATENTS

| Number | Name | Date |
| --- | --- | --- |
| 937,034 | Pringle | Oct. 12, 1909 |
| 1,708,177 | Holmes | Apr. 9, 1929 |
| 1,792,093 | Holmes | Feb. 10, 1931 |
| 1,792,467 | Osgood | Feb. 10, 1931 |
| 2,505,450 | Wemp | Apr. 25, 1950 |